(12) United States Patent
Gibson et al.

(10) Patent No.: US 6,980,507 B2
(45) Date of Patent: Dec. 27, 2005

(54) LUMINESCENCE-PHASE CHANGE BASED DATA STORAGE

(75) Inventors: Gary A. Gibson, Palo Alto, CA (US); Krzysztof Nauka, Redwood City, CA (US); Chung-Ching Yang, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 10/231,044

(22) Filed: Aug. 30, 2002

(65) Prior Publication Data

US 2004/0042373 A1    Mar. 4, 2004

(51) Int. Cl.[7] .................................................. G11B 9/00
(52) U.S. Cl. ........................ 369/126; 369/101; 365/151
(58) Field of Search .................................. 369/126, 101

(56) References Cited

U.S. PATENT DOCUMENTS

| | | | | |
|---|---|---|---|---|
| 4,982,362 A | * | 1/1991 | Comberg et al. | 365/118 |
| 6,125,095 A | * | 9/2000 | Gemma et al. | 369/126 |

* cited by examiner

Primary Examiner—William Korzuch
Assistant Examiner—Van T. Pham

(57) ABSTRACT

An ultra-high-density data storage device that relies on optical signals. The device includes a luminescent layer that emits light when stimulated by an electron beam. The device also includes a phase-change layer that contains data bits that may absorb or reflect the stimulated light before the light reaches a detector. Also, a method of data storage and retrieval that includes writing data bits in the phase-change layer, stimulating emissions in the luminescent layer, and reading data bits by monitoring the amount of light that reaches the detector.

21 Claims, 7 Drawing Sheets

LUMINESCENCE-PHASE CHANGE BASED DATA STORAGE

BACKGROUND

Data storage devices may be used in computers and other electronic equipment to store information in the form of data bits. Early data storage devices included computer punch-cards wherein the data consisted of holes with millimeter dimensions. The punch-cards were fed into a computer and the data on the punch cards was read. Today, the millimeter-sized holes have been replaced with much smaller data bits. As the data bits keep getting smaller and smaller, the bits may be positioned closer and closer together and the density of the data stored on a data storage device can be increased. When the data bits are of micrometer, sub-micrometer, or nanometer dimensions, the data storage devices may be referred to as ultra-high-density data storage devices.

FIG. 1 illustrates an ultra-high-density data storage device disclosed in U.S. Pat. No. 5,557,596 to Gibson et al. (the '596 Patent), incorporated herein in its entirety by reference. The ultra-high-density data storage device includes a set of field emitters 100, a data storage layer 110 that is located below the field emitters 100, a micromover 120 that holds the data storage layer 110 below the field emitters 100 and that can position the data storage layer 110 at desired locations relative to the field emitters 100, and electrical connections 130 that can supply energy to the field emitters 100. When supplied with energy, the field emitters 100 can bombard the data storage layer 110 with electron beams and can transform nanometer-scaled portions of the data storage layer from unwritten data bits, designated in FIG. 1 by the reference numeral 140, to written data bits, designated by the reference numeral 150. This transformation occurs via a writing process that will be discussed below.

When writing data to the data storage layer 110, respective field emitters 100 are energized, through the electrical connections 130, and are made to bombard the selected unwritten data bits 140 with electron beams. During the writing process, the electron beams are of sufficient power density to transform the bombarded unwritten data bits 140 from a first material state (e.g. a crystalline state, which may be assigned a "0" value) to a second material state (e.g. an amorphous state, which may be assigned a "1" value). Hence, a data bit having a value of "1" can be written to and stored on the data storage layer 110 by bombarding a crystalline, unwritten data bit 140 and by appropriately cooling the data bit 140 to form an amorphous, written data bit 150, respectively.

When erasing data from the data storage layer 110, respective field emitters 100 are energized, through the electrical connections 130, and are made to bombard the selected written data bits 150 with electron beams. During the erasing process, the electron beams are of sufficient power density to transform the bombarded written data bits 150 from a second material state (e.g., an amorphous state, which may be assigned a "1" value) to a first material state (e.g., a crystalline state, which may be assigned a "0" value). Hence, a data bit having a value of "0" can be restored on the data storage layer 110 by bombarding an amorphous, written data bit 150, thereby appropriately heating the data bit 150 to form a crystalline, erased data bit 140.

When reading data from the storage layer 110, the field emitters 100 again bombard the data bits 140, 150 with electron beams. However, instead of bombarding the data bits 140, 150 with electron beams that have sufficient energy to transform the data bits 140, 150 between the first and second material states discussed above, the field emitters 100 bombard the data bits 140, 150 with relatively low-power-density electron beams that do not effectuate a transformation but that do effectuate identification. Then, the interactions between the low-power-density electron beams and the data bits 140, 150 are monitored in order to read data.

During the reading operation, the low-power-density beams interact differently with unwritten data bits 140 than with written data bits 150. For example, a low-power-density beam may generate fewer secondary electrons when bombarding a crystalline, unwritten data bit 140 than when bombarding an amorphous, written data bit 150. Therefore, by monitoring the interactions between the relatively low-power-density beam and the data bit 140, 150 that the beam is bombarding (e.g. by monitoring the number of secondary electrons generated), it becomes possible to determine whether the bombarded data bit 140, 150 is storing a "1" or a "0" value and to read data stored in the data storage layer 110.

SUMMARY

A data storage device that includes an electron source capable of emitting an electron beam with a sub-micron-scaled spot size, a luminescent layer, located proximate to the electron source, the luminescent layer including a luminescent material capable of emitting light while being bombarded by the electron beam from the electron source, a detector, located near the luminescent layer, for sensing the light, and a phase-change layer, located between the luminescent layer and the detector, the phase-change layer capable of local transformation from a first phase to a second phase by the electron beam from the electron source.

A method of data storage and retrieval in a device having an electron source capable of emitting an electron beam with a sub-micron-scaled spot size, a luminescent layer, located proximate to the electron source, the luminescent layer including a luminescent material capable of emitting light while being bombarded by the electron beam from the electron source, a detector, located near the luminescent layer, for sensing the light; and a phase-change layer, located between the luminescent layer and the detector, the phase-change layer capable of local transformation from a first phase to a second phase by the electron beam from the electron source, the method including the steps of writing data by transforming a portion of the phase-change layer from the first phase to the second phase via an electron beam, and reading data from the storage medium by stimulating light emission from the luminescent layer with an electron beam of reduced power density and monitoring the light emitted from the luminescent layer that reaches the detector.

DESCRIPTION OF THE DRAWINGS

The preferred embodiments of the devices and methods for storing and retrieving ultra-high density data will be described in detail with reference to the following figures, in which like numerals refer to like elements, and where.

DETAILED DESCRIPTION

The following detailed description is presented to enable any person skilled in the art to make and use data storage devices. For purposes of explanation, specific nomenclature is set forth to provide a thorough understanding of data storage devices and of methods for storing and retrieving data. However, it will be apparent to one skilled in the art that these specific details are not required to make or operate the devices. Descriptions of specific applications are provided only as representative examples. Various modifications to the preferred embodiments will be readily apparent to one skilled in the art, and the general principles defined herein may be applied to other embodiments and applications without departing from the spirit and scope of the devices and methods discussed herein. The devices and methods discussed herein are not intended to be limited to the embodiments shown, but are to be accorded the widest possible scope consistent with the principles and features disclosed herein.

The need exists for additional types of ultra-high-density data storage devices beyond those described above. In response to this need, several embodiments of ultra-high-density data storage devices that operate optically are discussed below. These devices may include micrometer-scaled, sub-micron-scaled, and/or nanometer-scaled data bits.

Figure 1:
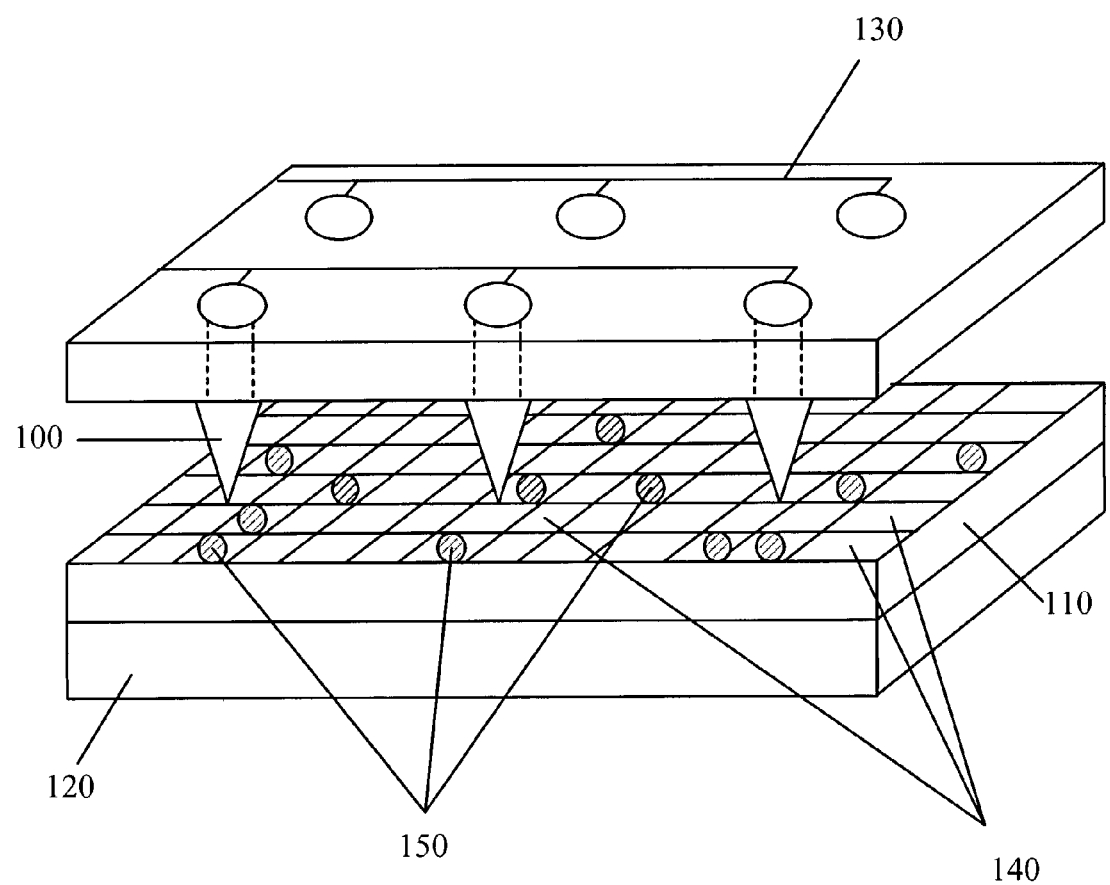
FIG. 1 illustrates a side perspective view of a data storage device according to the related art.
Figure 2:
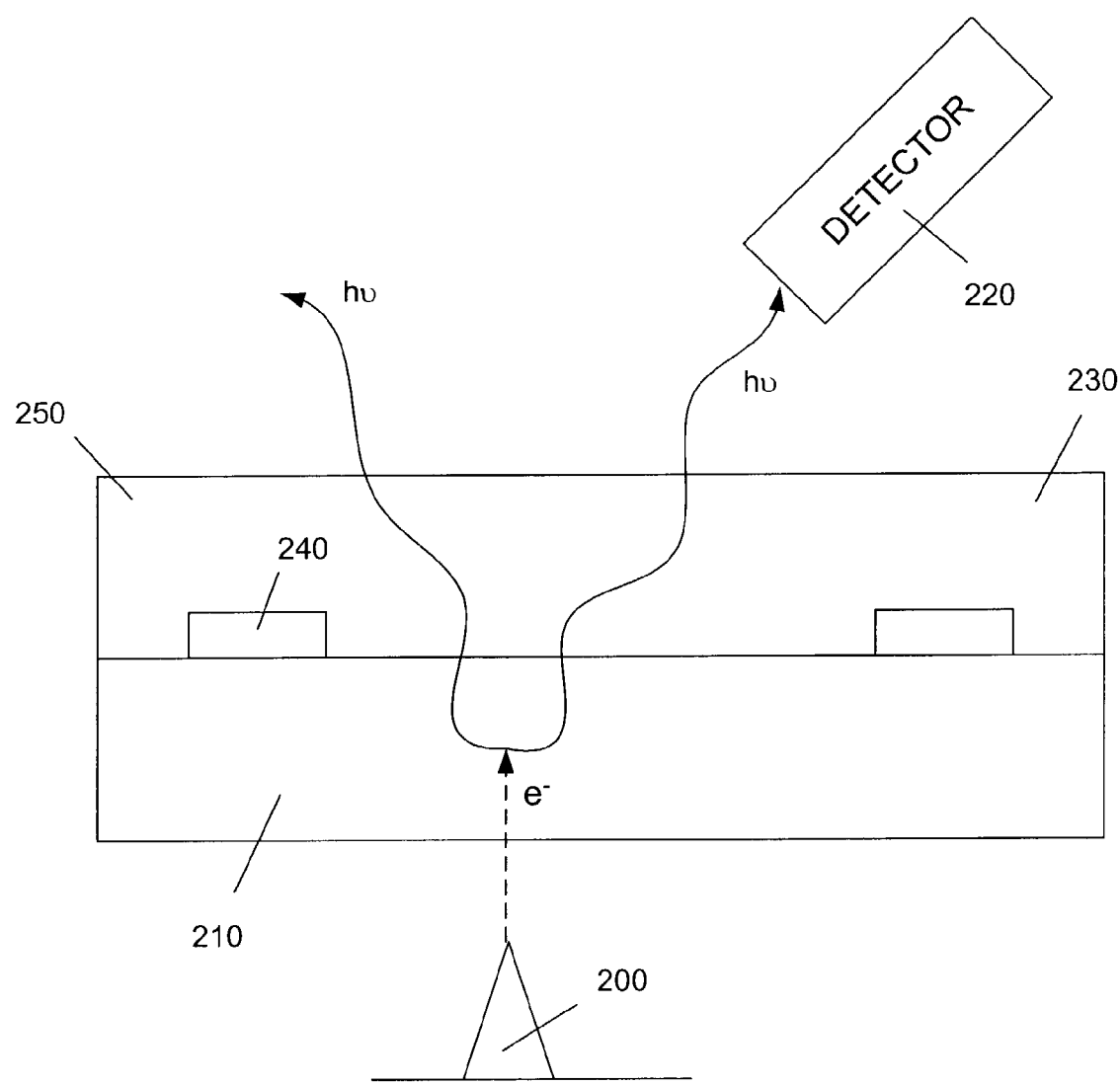
FIG. 2 is a cross-sectional view of a data storage device having a luminescent layer and a phase-change layer. The phase-change layer includes an optically transparent first-phase region and an optically opaque or absorptive second-phase region that is not positioned between the location in the luminescent layer where light is generated and the location of a detector.

With reference now to FIG. 2 of the Drawings, there is illustrated a cross-sectional view of one embodiment of an ultra-high-density data storage device. The device includes an electron source 200 that is capable of emitting an electron beam, e⁻, (also illustrated as a dashed line) of either a high or low power density. The electron beam, e⁻, preferably retains a sub-micron-scaled spot size throughout the path of the beam.

As understood in the art, many ultra-high-density data storage devices include an electron source 200 capable of emitting an electron beam that retains a nanometer-scaled spot size over the path of the beam. The electron source 200 may be a field emitter or another such device capable of emitting an electron beam of sufficient power density and of retaining the desired spot size.

Proximate to and, as illustrated in FIG. 2, above the electron source 200 is a luminescent layer 210. The luminescent layer 210 includes a luminescent material that is capable of emitting light while being bombarded by an electron beam from the electron source 200. The luminescent layer 210 may include an yttrium-aluminum-garnet (YAG)-based or yttrium-aluminum-perovskite (YAP)-based material. The luminescent layer 210 may also include rare earth element dopants and/or at least one of zinc oxide, GaN, zinc sulfide, and $Si_3O_4$.

With reference again to FIG. 2, a portion of the light emitted by the luminescent layer 210 is represented by the wavy arrows and designated by the reference symbol hv. Although light is generally emitted in all directions, for the purpose of clarity, only portions of the light that travels away from the bottom of the luminescent layer 210 are illustrated.

As shown in FIG. 2, adjacent to the luminescent layer 210 is a phase-change layer 230. As will be discussed below, the phase-change layer 230 is capable of being locally transformed from a first phase to a second phase and may, in some embodiments, be located immediately adjacent to the luminescent layer 210, sharing an interface. In some embodiments, an anti-reflective coating may also be present at this interface.

With further reference to FIG. 2, a detector 220 may be positioned such that the detector 220 is located near the phase-change layer 230 (e.g., within several micrometers). According to alternate embodiments, a detector 220 may even be in contact with the phase-change layer 230. For example, the phase-change layer 230, an optional anti-reflective coating (not illustrated in FIG. 2), and a luminescent layer 210 could be deposited on a detector 220 such as, but not limited to, a photodiode or phototransistor.

Multiple detectors 220 may be used in the ultra-high-density data storage device, especially when parallel read channels are included in the device. When multiple detectors 220 are used, in order to minimize cross-talk between adjacent data bits and detectors 220, the detectors 220 may preferably be located closer to the phase-change layer 230 than to each other.

The detector 220 or detectors 220 discussed above are typically capable of sensing the light, hv, that is being emitted from the luminescent layer 210. However, in order to be detected by a detector 220, the light, hv, must be able to travel to the location of the detector 220 for detection. In certain data storage devices, the detector 220 is chosen such that the detector 220 selectively detects light in a wavelength range that does not exactly match the wavelength range of the light emitted by the luminescent layer 210. These types of detectors 220 will be further discussed with reference to FIG. 6.

The transformation in the phase-change layer 230 between the first phase and the second phase may be induced by the electron source 200. The transformation may be induced if the electron source 200 emits a sufficiently high-power-density electron beam with an appropriate pulse shape. The electron beam should preferably also be incident on (i.e., bombard) a region of the phase-change layer 230 or a region of the luminescent layer 210 adjacent to the region of the phase-change layer 230 that is to be written to/phase-changed.

Figure 3:
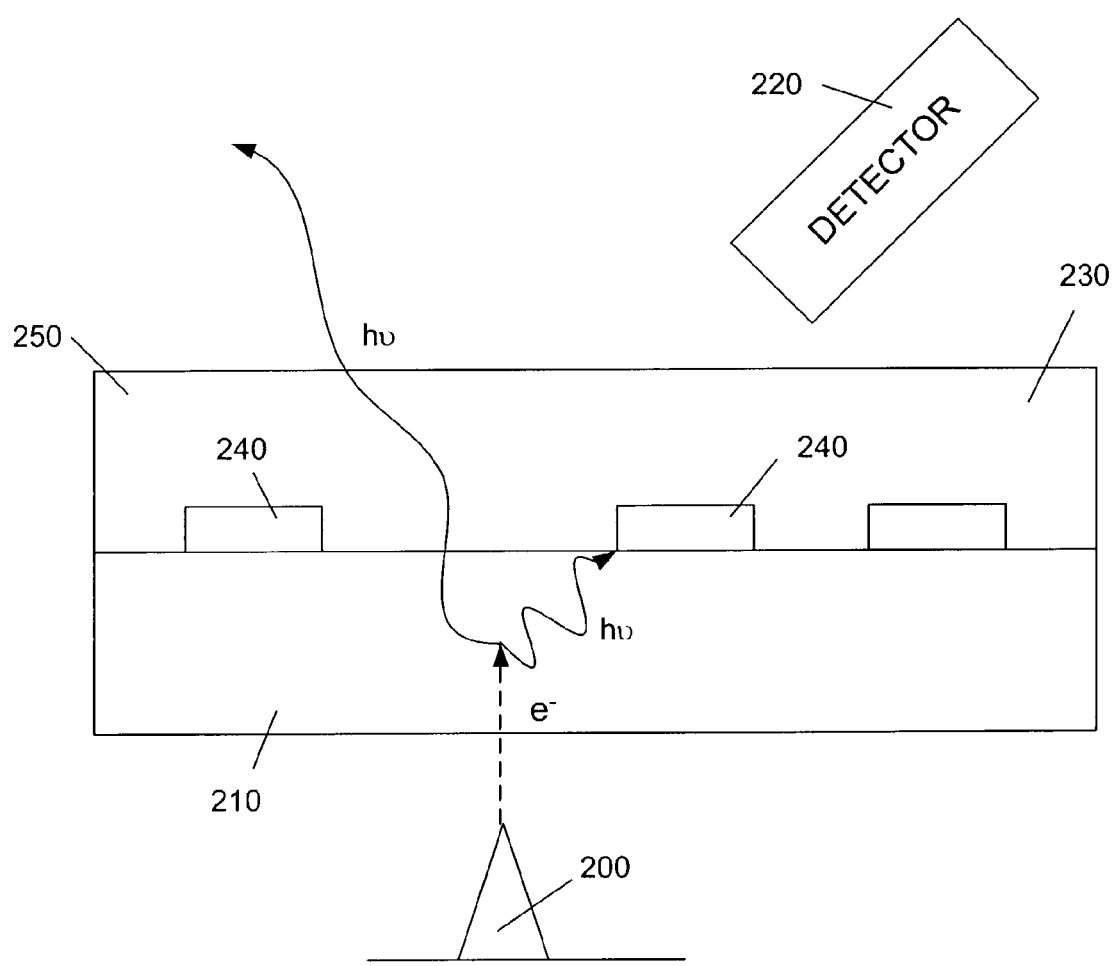
FIG. 3 is a cross-sectional view of the data storage device illustrated in FIG. 2 wherein the optically opaque second-phase region is positioned between the location in the luminescent layer where light is generated and the detector.

As understood in the art, repeated bombardments of the phase-change layer 230 or of a region of the luminescent layer 210 that is adjacent to the phase-change layer 230 with sufficiently high-power-density electron beams, along with appropriate cooling conditions, can lead to the presence of multiple second-phase regions 240 in a first-phase region 250 of the phase-change layer 230, as shown and described in more detail in FIG. 3.

According to the data storage device illustrated in FIG. 2, once light is stimulated in the luminescent layer 210, at least a portion of the stimulated light may travel relatively freely through the first-phase region 250 of the phase-change layer 230. This is true because the first-phase region 250 in FIG. 2 is optically transparent or transmissive of the light. However, as shown in FIG. 3, if the light attempts to travel through a second-phase region 240, the light is at least partially absorbed by the second-phase region 240 (in certain embodiments, some of the light may also or instead be reflected). Hence, if a second-phase region 240 is positioned between the location where the light is stimulated in the luminescent layer 210 and the detector 220, as shown in FIG. 3, most or all of the light will be unable to reach the detector 220 and will not be detected.

The luminescent layer 210, together with the phase-change layer 230, make up the data storage medium of the device illustrated in FIGS. 2–3, and the first-phase regions 250 and the second-phase regions 240 make up the respective data bits. If desired, a first-phase region 250 may be assigned, for example, a value of "0", and a second-phase region 240 may be assigned, for example, a value of "1". When reading data from the storage medium, light emission may be stimulated in a localized region of the luminescent layer 210 with an electron beam at a reduced power density from an electron source 200. The reduced or relatively low-power-density electron beam travels into the luminescent layer 210 and stimulates light emission.

The detector 220 may be used to monitor how much of the emitted light is received. When no second-phase region 240 is present between the location at which light emission has been stimulated and the location of the detector 220 to block emissions, the detector 220 will detect a relatively large amount of light. If, however, a second-phase region 240 is present between the location of light emission and the location of the detector 220, substantially blocking emissions, the detector 220 will detect a relatively small amount of light. Hence, by continuously bombarding the storage medium with a reduced-power-density beam of substantially constant power and by causing a relative motion between an electron source 200 and the storage medium, "1" data bits may be detected or read from the storage medium when the detector 220 detects relatively little light, and "0" data bits may be read from the storage medium when a relatively large amount of light is detected. This allows for data retrieval from the ultra-high-density data storage device illustrated in FIGS. 2–3.

Writing data to an ultra-high-density data storage device, such as the one illustrated in FIG. 2, includes transforming one or more portions of the phase-change layer 230 from a transparent first phase to an opaque second phase, or vice-versa, to form respective first-phase regions 250 and second-phase regions 240 in the phase-change layer 230. As discussed above, phase transformations may be effectuated by bombardment of selected regions of the phase-change layer 230 with an electron beam and appropriate subsequent cooling of the bombarded regions. For example, an optically transmissive, crystalline first phase of a material may become an opaque, amorphous second phase if bombarded by an electron beam with sufficient power density to melt the material and subsequently cooled rapidly enough to quench the material. Similarly, an optically opaque, amorphous first phase may become an optically transmissive, crystalline second phase if bombarded by an electron beam with sufficient power density to melt the amorphous phase and subsequently cooled slowly enough to allow a crystalline structure to form.

As an alternate example, the electron beam may bombard an optically opaque compound in the phase-change layer 230, forming the aforementioned second-phase region 240, and transform the opaque compound into a transparent compound by volatilization, oxidation, etc. The opaque compound could then be the first material state and the transparent compound could be the second material state.

Another alternative for writing to the storage medium includes first locally heating the luminescent layer 210 with an electron beam. Then, as the heat in the luminescent layer 210 dissipates or travels from the luminescent layer 210 to the phase-change layer 230, the heat can locally transform a portion of the phase-change layer 230 from a first phase to a second phase. Such a writing process works best when the luminescent layer 210 has a higher melting temperature than the phase-change layer 230. This is true because it is generally preferable that melting of the luminescent layer 210 be prevented when writing to the phase-change layer 230. The luminescent layer 210 may also be chosen to include a material whose luminescent properties are not damaged by the temperature attained within the luminescent layer 210 as the phase-change layer 230 is written to.

According to the writing process that includes locally heating the luminescent layer 210 to transform the phase-change layer 230, the luminescent layer 210 may be chosen to include a material that has a high thermal conductivity (e.g. a higher thermal conductivity than a material included in the phase-change layer 230). When a material with a high thermal conductivity is included in the luminescent layer 210, the temperature gradient across the luminescent layer 210 can be minimized, thereby lessening the chance that the temperature of any part of the luminescent layer 210 will become hot enough to incur damage as a result of the localized heating.

On the other hand, the luminescent layer 210 may be chosen to include a material that has a low thermal conductivity (e.g. a lower thermal conductivity than a material included in the phase-change layer 230). When a material with a low thermal conductivity is included in a thin luminescent layer 210, smaller data bits may be written to the phase-change layer 230 because the heat that transforms the phase-change layer 230 may be more highly localized. Such smaller data bits allow for a higher density of data to be stored in the storage medium. In addition, lower thermal conductivities can reduce the power required to effect the phase-change, thereby allowing for the use of less powerful electron sources 200 or emitters, lowering the overall power requirements of the device, etc . . .

Once written to, the storage medium can store data that may be read by the reading method discussed above. This allows for the non-volatile data storage in sub-micron-scaled or, in some cases, in nanometer-scaled data bits.

It should be understood that, in certain embodiments, the second-phase portions 240 of the phase-change layer 230 may extend close to (or all the way through) the interface between the luminescent layer 210 and the phase-change layer 230. In such embodiments, the local radiative and non-radiative recombination rates near the interface may depend on whether the neighboring regions of the phase-change layer 230 are in a first phase or a second phase. Hence, in these embodiments, when bombarding the luminescent layer 210 with a low-power-density electron beam, different amounts of light may be generated, dependent on whether a first-phase region 250 or a second-phase region 240 is located at the interface. This provides another contrast mechanism whereby data bits can be read by measuring the relative amount of light reaching the detector 220 as the electron source 200 and the storage medium move relative to each other.

Figure 4:
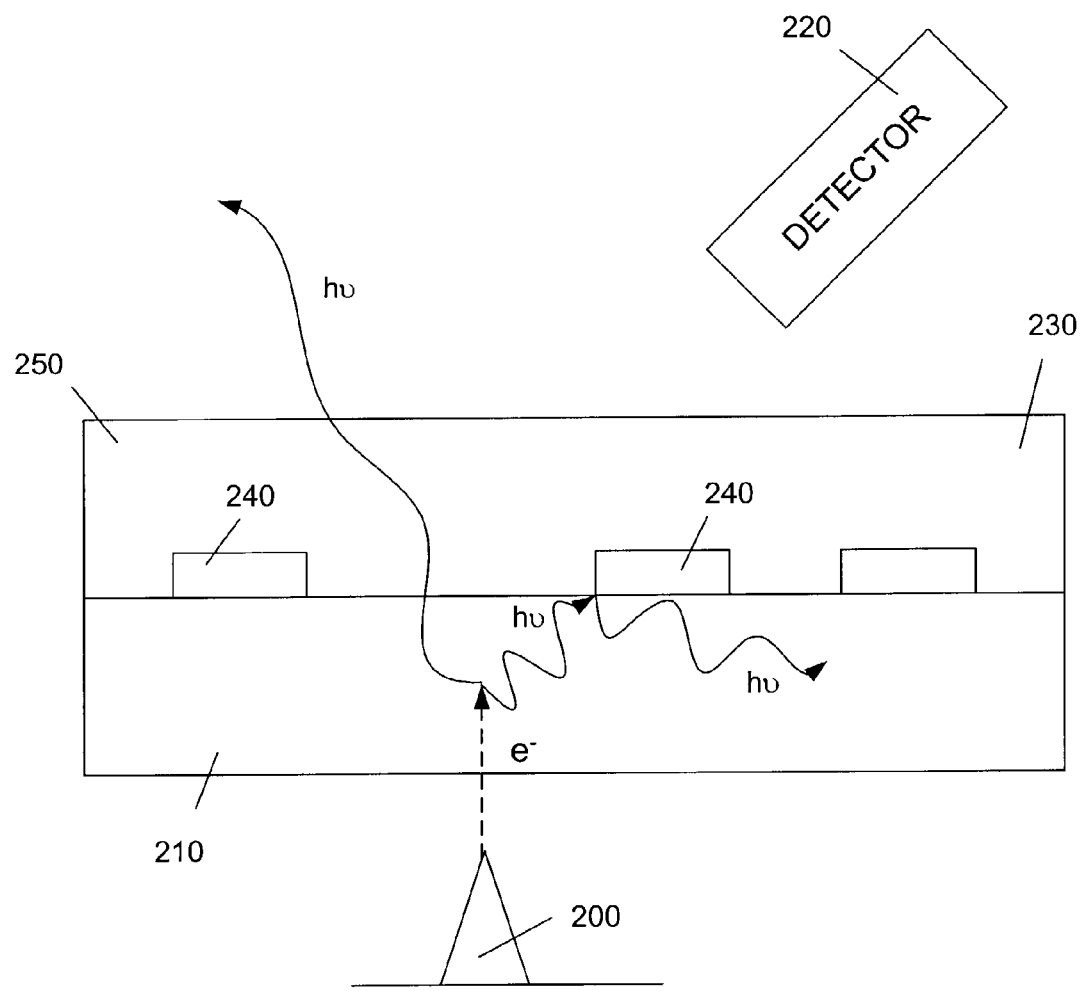
FIG. 4 is a cross-sectional view of a data storage device having a luminescent layer and a phase-change layer wherein the phase-change layer includes an optically transparent first-phase region and a reflective second-phase region.

With reference now to FIG. 4 of the Drawings, there is illustrated a cross-sectional view of another ultra-high-density data storage device having a luminescent layer 210 and a phase-change layer 230. The device in FIG. 4 has a phase-change layer 230 that includes an optically transparent first-phase region 250 and several reflective second-phase regions 240. The first-phase region 250 transmits a majority of the light that attempts to travel through the first-phase region 250. However, the second-phase regions 240 reflect a majority of the light that attempts to travel through the second-phase regions 240. (In some embodiments of ultra-high-density data storage devices, the second-phase regions 240 may also absorb a significant portion of the light that attempts to travel through the second-phase regions 240.) Hence, when reading data from the device illustrated in FIG. 4, the electron source 200 and storage medium may be moved relative to each other while the electron source 200 emits a reduced-power-density electron beam of substantially constant power. A detector 220 may then be used to monitor the amount of light reaching the detector 220. Low levels of light detection may result in the detection or reading of "1" data bits while high levels of light detection may result in the detection or reading of "0" data bits, or vice-versa.

Analogously to the data storage device illustrated in FIGS. 2–3, the second-phase regions 240 may be written in the phase-change layer 230 by using an electron beam and appropriate cooling conditions. In some data storage devices, such as the devices illustrated in FIGS. 2–5, appropriate cooling conditions for transforming regions between the first and second phases may require only sufficiently fast turn-off of the electron bean under ambient temperatures. Hence, additional cooling components may not be necessary.

Figure 5:
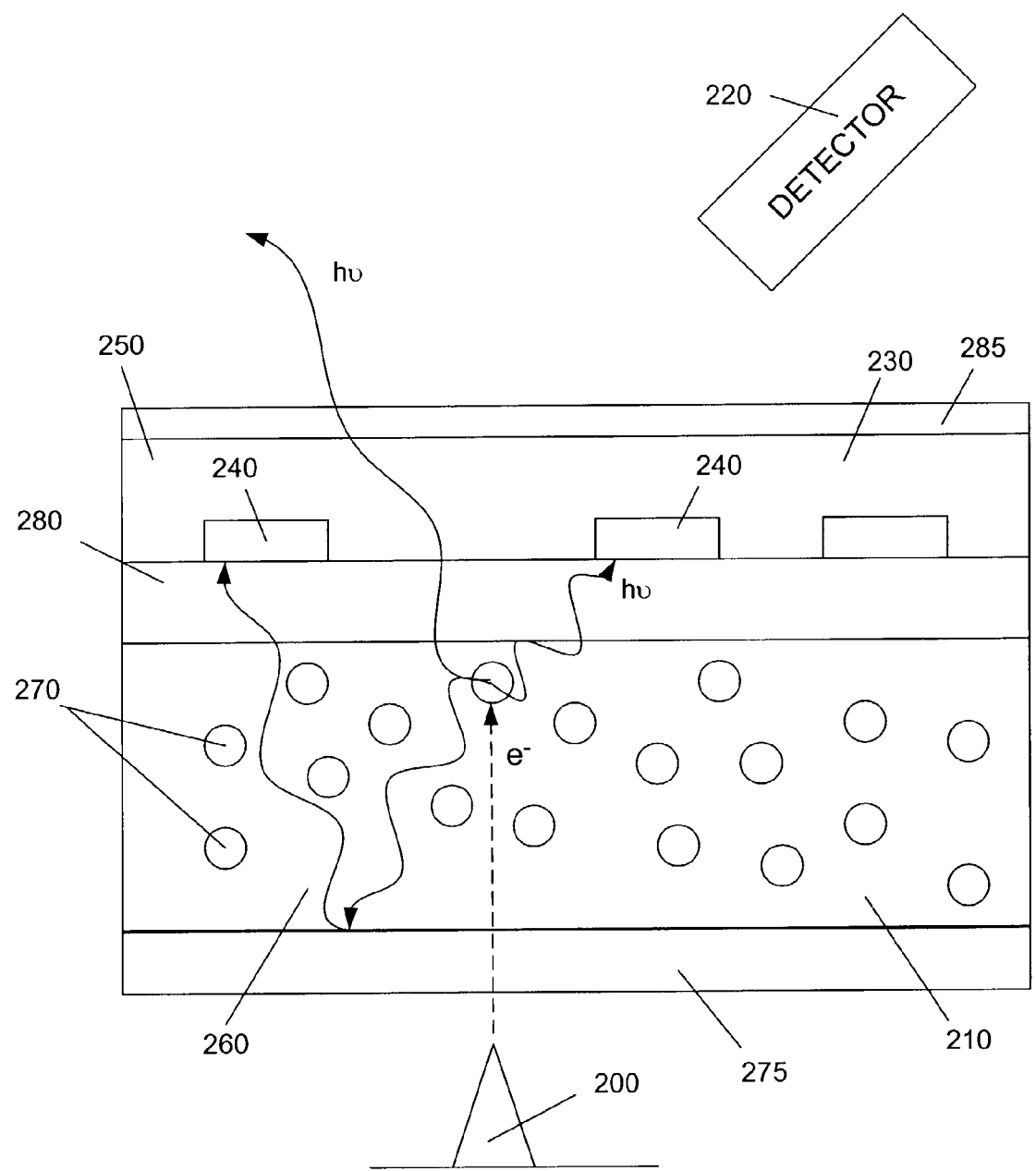
FIG. 5 is a cross-sectional view of a data storage device that includes an index-matching layer, a phase-change layer, and an optically neutral medium containing optically active nanoparticles.

With reference now to FIG. 5, there is shown a cross-sectional view of an ultra-high-density data storage device where the luminescent layer 210 includes an optically neutral medium 260 and optically active nanoparticles 270 (i.e., nanometer-scaled particles) that are contained in the optically neutral medium 260. The device illustrated in FIG. 5 also includes an optional reflective coating 275, positioned near the electron source 200, that reflects light from the luminescent layer 210 towards the detector 220. An optional first index matching layer 280 (which may be anti-reflective) is positioned between the aforedescribed luminescent layer 210 and the phase-change layer 230. Optionally, and particularly when the detector 220 is in contact with the storage medium, the storage medium may include a second index matching layer 285 (which may be anti-reflective) that may be positioned between the phase-change layer 230 and the detector 220.

The nanoparticles 270 may include, among other materials, II–VI and III–V semiconductor compounds. The luminescent layer 210 may include, among other materials, ZnO, GaN, YAG, YAP, and ZnS. The phase-change layer 230 may include, for example, a chalcogenide-based phase-change material similar to those used in optical recording. The first-phase region 250 could then, for example, be the crystalline state of one of these materials and the second-phase region 240 could be the amorphous state. The exact phase-change material chosen could then depend on the wavelength range that the luminescent layer 210 luminesced in, as well as the wavelength range that the detector 220 was sensitive to. Further, the combination of phase-change layer 230, luminescent layer 210, and detector 220 could be chosen to optimize the signal-to-noise. The choice of the phase-change layer 220 could also depend on how low of a melting point is needed so as not to damage the other layers, the reactivity of the phase-change layer 220 with neighboring layers, etc . . .

The reflective coating 275 may be chosen to be very thin (e.g., less than one micron thick) and is preferably heat-resistant, thus preventing damage to the reflective properties of the reflective coating's 275 interface with the luminescent layer 210. The first index matching layer 280 and the second index matching layer 285 and/or reflective layer may also be chosen to be very thin and heat-resistant.

Among the reasons for making the luminescent layer 210, the reflective coating 275, and the first index matching layer 280 thin is to minimize the temperature change across them. If these layers 210, 275, 280 are thick, then the surface closest to the emitter will get much hotter than the temperature required to effect the phase-change in phase-change layer 230. Another reason for making the layers 210, 275, 280 thin is that it becomes difficult to write small data bits in the phase-change layer 230 if the layers 210, 275, 280 are thick since thicker layers allow the heat to spread laterally before reaching the phase-change layer 230.

When bombarded by a reduced-power-density electron beam, the nanoparticles 270 in this data storage device embodiment emit light. A portion of the emitted light travels towards the detector 220 for detection or may be substantially (e.g., more than 80%) absorbed, substantially reflected away from the detector 220, or both, depending upon the type of second-phase region 240 that is present in the phase-change layer 230. Hence, the reading and writing steps discussed above with reference to FIGS. 2–4 are readily applicable to the device illustrated in FIG. 5.

A purpose of the index matching layer 280 illustrated in FIG. 5 is to maximize the amount of light that travels out of the luminescent layer 210. Since adjacent materials with similar indices of refraction reflect less light at their interfaces, the device illustrated in FIG. 5 allows more light to travel towards the detector 220 than would a device without the index matching layer 280. Hence, smaller amounts of light need to be generated in the luminescent layer 210 to allow for detection by the detector 220.

Figure 6:
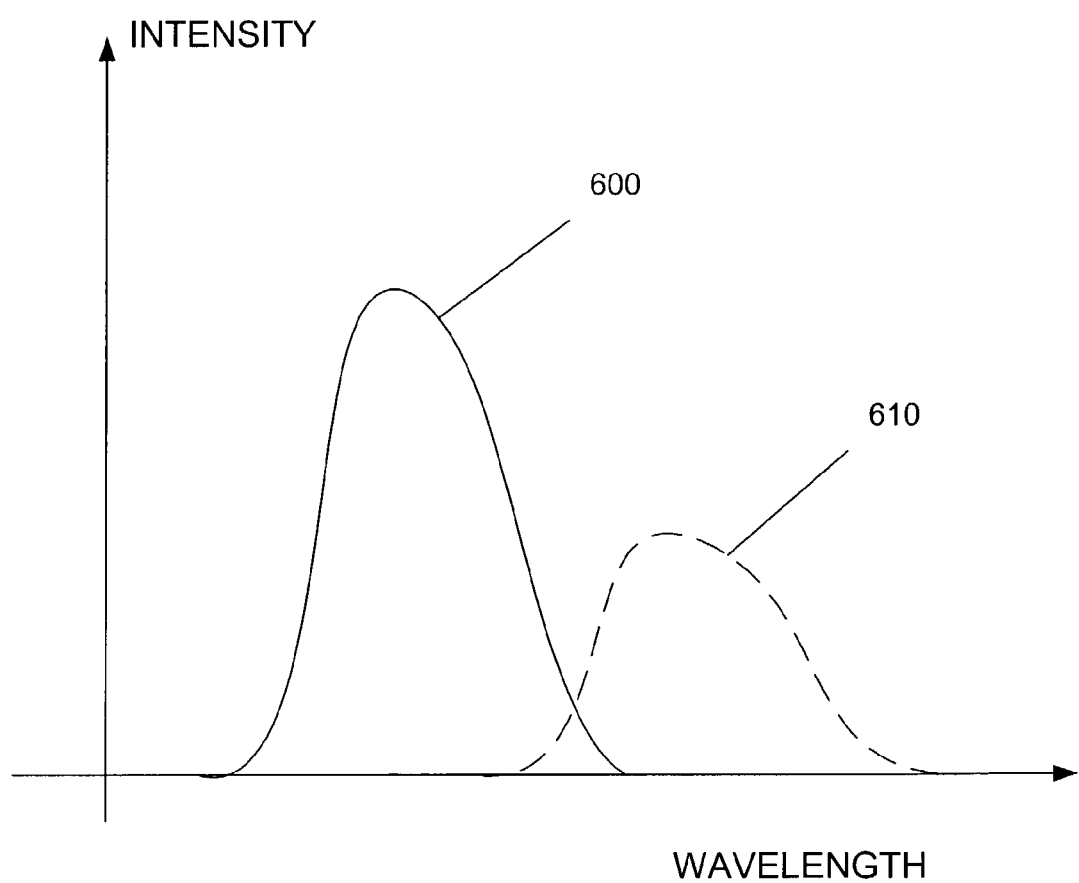
FIG. 6 is a graph of an absorption spectrum of one material in the phase-change layer and a shifted emission spectrum of the same material.

With reference now to FIG. 6 of the Drawings, there is illustrated a graph of an absorption spectrum 600 of one material that may be included in one of the phase-change layers 230 discussed above, and a graph of a shifted emission spectrum 610 of the same material. Certain ultra-high-density data storage devices include absorptive second-phase regions 240 that absorb a majority of light in a first wavelength range that attempts to pass through the second-phase regions 240 (e.g., the wavelength range of the light emitted by the luminescent layer 210). The second-phase regions 240 then re-emit at least some of the absorbed light in a second wavelength range (e.g., a wavelength range to which the detector 220 is sensitive).

When re-emitting second-phase regions 240 are used in data storage devices, such as those illustrated in FIGS. 2–3 and 5, additional reading methods are available. For example, a detector 220 may be provided that detects light in a selected subsection of the re-emission wavelength range 610. Then, light emission may be stimulated from the luminescent layer 210 in the absorption wavelength range 600. The absorption wavelength range 600 may, as shown in FIG. 6, overlap slightly with the re-emission wavelength range 610 or that may not overlap at all with the re-emission wavelength range 610. Then, if at least some of the light emission from the luminescent layer 210 is absorbed with a second-phase region 240 of the phase-change layer 230 (i.e., if there is a second-phase region 240 between the location of light emission in the luminescent layer 210 and the detector 220), then the absorbed light emission may be at least partially re-emitted by the second-phase region 240 in the re-emission wavelength range 610.

Thus, a detector 220 that is selected to detect light preferentially or solely over a subset of wavelengths in the re-emisson wavelength range 610 but not in the emission wavelength range 600 can be used to detect second-phase regions 240. By detecting the presence or absence of second-phase regions 240, "0" and "1" data bits may be read from the storage medium. Such detection may also be more sensitive and/or less noisy since the phase-change layer 230 may be chosen to include a material that can provide more contrast and/or better signal-to-noise in the wavelength range to which the detector 220 is sensitive as compared to devices that rely on changes in light absorption and/or reflection.

In some embodiments, the material in the phase-change layer 230 may provide a large modulation in the light reaching the detector 220 only in the wavelength range monitored by the detector 220. In these embodiments, noise from a relatively constant background of unmodulated light at other wavelengths may be eliminated by using a detector 220 that only monitors the modulated light. Another advantage of using a detector 220 that only detects a selected wavelength range is that the detector 220 may be easier and/or cheaper to incorporate into the manufacturing process for the device.

To efficiently re-emit light, one possibility is to dope the phase-change layer 230 with a material that causes radiative defects at a desired wavelength. Alternatively, some direct bandgap phase-change layers 230 may re-radiate efficiently in the crystalline state without defects. Either of these possibilities may be used according to the devices and methods discussed herein.

Figure 7:
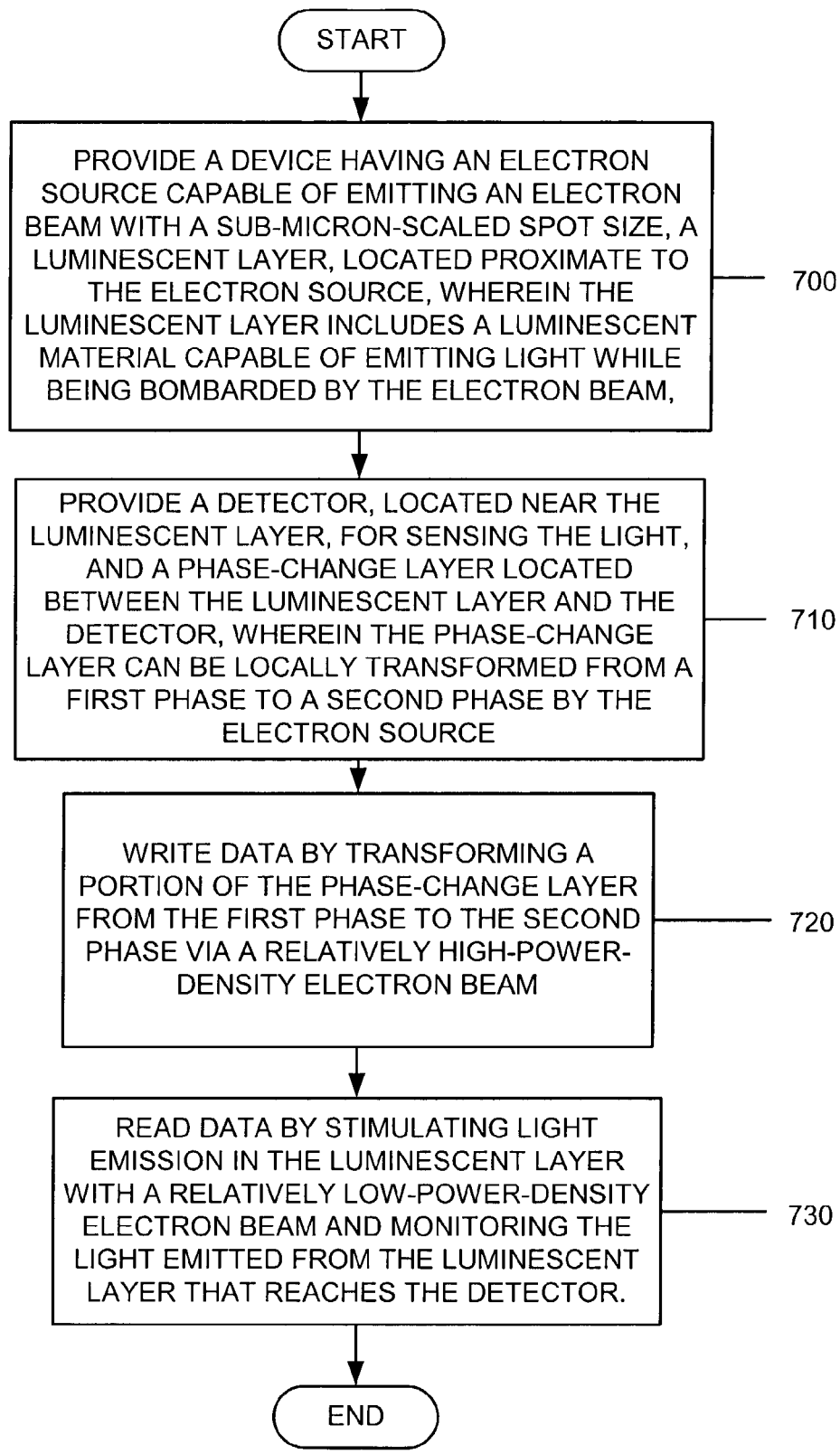
FIG. 7 is a flowchart of a method for storing and retrieving data from a data storage device.

FIG. 7 illustrates a flowchart of a method for storing and retrieving data from an ultra-high-density data storage device. Step 700 specifies providing a device having an electron source 200 capable of emitting an electron beam with a sub-micron-scaled spot size, a luminescent layer 210, located proximate to the electron source 200, wherein the luminescent layer 210 includes a luminescent material capable of emitting light while being bombarded by the electron beam. Step 710 also specifies providing a detector 220, located near the luminescent layer 210, for sensing the light and a phase-change layer 230 located between the luminescent layer 210 and the detector 230, wherein the phase-change layer 230 can be locally transformed from a first phase to a second phase by the electron source 200. Step 720 then specifies writing data by transforming a portion of the phase-change layer 230 from the first phase to the second phase via a relatively high-power-density electron beam. Finally, step 730 specifies reading data by stimulating light emission in the luminescent layer 210 with a relatively low-power-density electron beam and monitoring the light emitted from the luminescent layer 210 that reaches the detector 220.

While the aforementioned and illustrated devices and methods for storing and retrieving ultra-high density data have been described in connection with exemplary embodiments, those skilled in the art will understand that many modifications in light of these teachings are possible, and this application is intended to cover any variation thereof.

What is claimed is:

1. A data storage device, comprising:
   an electron source capable of emitting an electron beam with a sub-micron-scaled spot size;
   a luminescent layer, located proximate to the electron source, the luminescent layer including a luminescent material capable of emitting light while being bombarded by the electron beam from the electron source;
   a detector, located near the luminescent layer, for sensing the light; and
   a phase-change layer located between the luminescent layer and the detector, the phase-change layer capable of local transformation from a first phase to a second phase by the electron beam from the electron source.

2. The device of claim 1, wherein the first phase transmits the light through the phase-change-layer and wherein the second phase reflects the light.

3. The device of claim 1, wherein the first phase transmits the light through the phase-change-layer and wherein the second phase absorbs the light.

4. The device of claim 3, wherein the second phase absorbs the light in a first wavelength range and re-emits at least a portion of the light in a second wavelength range.

5. The device of claim 1, wherein the first phase prevents transmission of the light through the phase-change-layer in a first wavelength range and the second phase absorbs the light in the first wavelength range and re-emits at least a portion of the light in a second wavelength range.

6. The device of claim 1, wherein the first phase permits transmission of the light through the phase-change-layer in a first wavelength range and the second phase absorbs the light in the first wavelength range and re-emits at least a portion of the light in a second wavelength range.

7. The device of claim 1, wherein the luminescent layer has a damage threshold temperature higher than a melting temperature of the phase-change layer.

8. The device of claim 1, wherein the luminescent layer comprises a material having a high thermal conductivity.

9. The device of claim 1, wherein the luminescent layer comprises a material having a low thermal conductivity.

10. The device of claim 1, wherein the luminescent layer and the phase-change layer are adjacent and share an interface.

11. The device of claim 10, wherein the interface has a radiative recombination rate and a non-radiative recombination rate that each depends on whether the phase-change layer is in the first phase or the second phase.

12. The device of claim 1, wherein the luminescent layer comprises at least one of a YAG-based material, a rare earth element dopant, a YAP-based material, GaN, Zn oxide, Zn sulfide, and $Si_3O_4$.

13. The device of claim 1, wherein the luminescent layer comprises an optically neutral medium and optically active nanoparticles in the optically neutral medium.

14. The device of claim 1, further comprising an index matching layer positioned between the luminescent layer and the phase-change layer.

15. The device of claim 1, further comprising an index matching layer positioned between the phase-change layer and the detector.

16. The device of claim 1, further comprising a reflective layer positioned between the luminescent layer and the electron source.

17. A method of data storage and retrieval, the method comprising the steps of:

writing data to a device having an electron source capable of emitting an electron beam with a sub-micron-scaled spot size, a luminescent layer, located proximate to the electron source, the luminescent layer including a luminescent material capable of emitting light while being bombarded by the electron beam from the electron source, a detector, located near the luminescent layer, for sensing the light; and a phase-change layer located between the luminescent layer and the detector, the phase-change layer capable of local transformation from a first phase to a second phase by the electron beam from the electron source, the writing step including transforming a portion of the phase-change layer from the first phase to the second phase via an electron beam; and reading data from the device by stimulating light emission in the luminescent layer with a reduced-power-density electron beam and monitoring the light emitted from the luminescent layer that reaches the detector.

18. The method of claim 17, wherein the step of writing further comprises the step of:

heating the luminescent layer with the electron beam such that the first portion of the phase-change layer transforms from the first phase to the second phase as heat travels from the luminescent layer to the phase-change-layer.

19. The method of claim 17, wherein the step of reading further comprises the steps of:

providing a detector that detects light in a first wavelength range; stimulating light emission from the luminescent layer in a second wavelength range; absorbing at least a portion of the light emission with the phase-change layer; and re-emitting light in the first wavelength range from the phase-change layer.

20. The method of claim 17, wherein the step of reading further comprises the step of:

using a portion of the phase-change layer that is in the second phase to reflect some of the light away from the detector.

21. The method of claim 17, wherein the step of reading further comprises the step of:

using a portion of the phase-change layer that is in the second phase to absorb some of the light.

* * * * *